(12) United States Patent
Kirkpatrick

(10) Patent No.: US 7,590,539 B1
(45) Date of Patent: Sep. 15, 2009

(54) SYSTEM AND METHOD FOR EMAIL NOTIFICATION

(75) Inventor: Mark Kirkpatrick, Konyers, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 962 days.

(21) Appl. No.: 09/604,965

(22) Filed: Jun. 28, 2000

(51) Int. Cl.
*G10L 21/00* (2006.01)
(52) U.S. Cl. ............... 704/260; 704/270.1; 715/752; 379/88.01; 379/88.04
(58) Field of Classification Search ........... 704/260, 704/270.1; 715/752; 379/88.01
See application file for complete search history.

(56) References Cited

U.S. PATENT DOCUMENTS

| | | | |
|---|---|---|---|
| 5,475,738 A | 12/1995 | Penzias | |
| 5,479,411 A * | 12/1995 | Klein | 379/88.13 |
| 5,862,325 A * | 1/1999 | Reed et al. | 709/201 |
| 5,944,786 A | 8/1999 | Quinn | |
| 5,995,597 A | 11/1999 | Woltz et al. | |
| 6,009,469 A * | 12/1999 | Mattaway et al. | 709/227 |
| 6,035,273 A * | 3/2000 | Spies | 704/270 |
| 6,052,442 A * | 4/2000 | Cooper et al. | 379/88.19 |
| 6,064,990 A | 5/2000 | Goldsmith | |
| 6,131,121 A * | 10/2000 | Mattaway et al. | 709/227 |
| 6,226,678 B1 * | 5/2001 | Mattaway et al. | 709/230 |
| 6,249,808 B1 * | 6/2001 | Seshadri | 709/206 |
| 6,263,064 B1 * | 7/2001 | O'Neal et al. | 379/201.03 |
| 6,282,183 B1 * | 8/2001 | Harris et al. | 370/338 |
| 6,335,963 B1 | 1/2002 | Bosco | |
| 6,345,288 B1 * | 2/2002 | Reed et al. | 709/201 |
| 6,349,336 B1 * | 2/2002 | Sit et al. | 709/227 |
| 6,351,523 B1 * | 2/2002 | Detlef | 379/88.14 |
| 6,400,810 B1 | 6/2002 | Skladman et al. | |
| 6,421,781 B1 | 7/2002 | Fox et al. | |
| 6,453,337 B2 * | 9/2002 | Miller et al. | 709/204 |
| 6,457,045 B1 * | 9/2002 | Hanson et al. | 709/206 |
| 6,463,145 B1 * | 10/2002 | O'Neal et al. | 379/211.02 |
| 6,507,643 B1 * | 1/2003 | Groner | 379/88.14 |
| 6,560,456 B1 | 5/2003 | Lohtia et al. | |
| 6,633,848 B1 * | 10/2003 | Johnson et al. | 704/277 |
| 6,640,301 B1 | 10/2003 | Ng | |
| 6,647,260 B2 | 11/2003 | Dusse et al. | |
| 6,728,731 B2 * | 4/2004 | Sarukkai et al. | 707/104.1 |
| 6,732,151 B1 * | 5/2004 | Tobias et al. | 709/206 |

(Continued)

OTHER PUBLICATIONS

Bedingfield; U.S. Appl. No. 10/706,361, filed Nov. 12, 2003 (Note: Copy not provided as part of PTO file).

(Continued)

*Primary Examiner*—Michael N Opsasnick
(74) *Attorney, Agent, or Firm*—Thomas, Kayden, Horstemeyer & Risley, LLP

(57) ABSTRACT

Email subscribers are notified of the receipt of new email messages when they are not at their computers via voice or page. An email notification server polls the email server corresponding to the subscriber's email account for the presence of new email messages. New email messages are obtained. Header information is extracted. If new email notification is by voicemail, the extracted header information is converted from text to voice. A voicemail message containing the extracted header information is saved on the voicemail system corresponding to the subscriber for whom the email message was intended. The email notification server can also send a page to notify the subscriber of the presence of new email.

41 Claims, 5 Drawing Sheets

U.S. PATENT DOCUMENTS

| | | | |
|---|---|---|---|
| 6,738,820 | B2 | 5/2004 | Hilt |
| 6,742,127 | B2 | 5/2004 | Fox et al. |
| 6,754,181 | B1 * | 6/2004 | Elliott et al. ................. 370/252 |
| 6,766,299 | B1 * | 7/2004 | Bellomo et al. ............. 704/276 |
| 6,895,558 | B1 * | 5/2005 | Loveland .................... 715/746 |
| 6,965,918 | B1 | 11/2005 | Arnold et al. |
| 6,981,062 | B2 | 12/2005 | Suryanarayana |
| 6,987,840 | B1 | 1/2006 | Bosik |
| 7,085,812 | B1 | 8/2006 | Sherwood |
| 7,113,501 | B2 | 9/2006 | Garakani et al. |
| 7,120,671 | B2 | 10/2006 | Gusler et al. |
| 7,136,475 | B1 | 11/2006 | Rogers |
| 7,196,807 | B2 | 3/2007 | Goldstone |
| 7,240,095 | B1 | 7/2007 | Lewis |
| 2002/0032741 | A1 | 3/2002 | Hilt |
| 2002/0035607 | A1 | 3/2002 | Checkoway et al. |
| 2002/0061003 | A1 | 5/2002 | Sumner et al. |
| 2002/0064137 | A1 | 5/2002 | Garakani |
| 2002/0155848 | A1 | 10/2002 | Suryanarayana |
| 2003/0055902 | A1 | 3/2003 | Amir et al. |
| 2003/0072451 | A1 | 4/2003 | Pimentel et al. |
| 2003/0142364 | A1 | 7/2003 | Goldstone |
| 2003/0177171 | A1 | 9/2003 | Brown et al. |
| 2004/0086094 | A1 | 5/2004 | Bosik |
| 2004/0087300 | A1 | 5/2004 | Lewis |
| 2005/0100143 | A1 | 5/2005 | Bedingfield |
| 2008/0205602 | A1 | 8/2008 | Bishop |
| 2008/0205610 | A1 | 8/2008 | Bishop |

OTHER PUBLICATIONS

Bedingfield; Final Rejection mailed Oct. 20, 2008 for U.S. Appl. No. 10/706,361, filed Nov. 12, 2003 (Note: Copy not provided as part of PTO file).

Bedingfield; Non-Final Rejection mailed Jan. 11, 2008 for U.S. Appl. No. 10/706,361, filed Nov. 12, 2003 (Note: Copy not provided as part of PTO file).

Lewis; U.S. Appl. No. 10/080,484, filed Feb. 22, 2002 (Note: Copy not provided as part of PTO file).

Bishop; U.S. Appl. No. 11/678,368, filed Feb. 23, 2007 (Note: Copy not provided as part of PTO file).

Bishop; U.S. Appl. No. 11/678,423, filed Feb. 23, 2007 (Note: Copy not provided as part of PTO file).

Lewis; Non-Final Rejection mailed Apr. 7, 2005 for U.S. Appl. No. 10/080,484, filed Feb. 22, 2002 (Note: Copy not provided as part of PTO file).

Lewis; Final Rejection mailed Oct. 5, 2005 for U.S. Appl. No. 10/080,484, filed Feb. 22, 2002 (Note: Copy not provided as part of PTO file).

Lewis; Non-Final Rejection mailed Apr. 10, 2006 for U.S. Appl. No. 10/080,484, filed Feb. 22, 2002 (Note: Copy not provided as part of PTO file).

Lewis; Final Rejection mailed Sep. 28, 2006 for U.S. Appl. No. 10/080,484, filed Feb. 22, 2002 (Note: Copy not provided as part of PTO file).

Lewis; Notice of Allowance and Fees Due mailed Mar. 6, 2007 for U.S. Appl. No. 10/080,484, filed Feb. 22, 2002 (Note: Copy not provided as part of PTO file).

Bedingfield; Notice of Allowance mailed Feb. 24, 2009 for U.S. Appl. No. 10/706,361 filed Nov. 12, 2003 (Copy not provided as generated by PTO).

* cited by examiner

- Subscriber Name
- Poll Time (Frequency)
- Last Polled
- Email Srv
- Email Acct
- Email PW
- Email TYPE
- Voicemail SRV
- Voicemail ACCT
- Voicemail PW
- Pager SRV
- Pager ACCT
- Pager PW

200

SYSTEM AND METHOD FOR EMAIL NOTIFICATION

BACKGROUND

1. Field of Invention

The present invention relates generally to the field of telecommunications. More specifically, the present invention relates to email notification systems.

2. Background of the Invention

Today, people communicate with one another in numerous ways. Telephones, I-pagers, cell phones and email are just a few examples of these communication technologies. Often however, the person to whom a communication is attempted is not available to answer a call, page or email immediately. Consequently, those initiating the communication desire to leave a message. For whatever reason, most people tend to check their voicemail more often than other message technologies, for example, email. Although conventional voicemail systems can be tied into pagers to alert subscribers that they have a pending voicemail, this is not the case for email users. Email users are not notified of the incoming email if they are not sitting at their computer. Indeed, people leaving an email will often call the email recipient to notify them that an email has been sent and to look for it. This is undesirable considering the large number of emails being sent today.

Some conventional email systems allow the email messages to be automatically forwarded to a pager. However, not all email systems offer this capability, and not all pagers are able to take advantage of it. Consequently, not all pager users can have their email messages sent to their pagers.

SUMMARY OF THE INVENTION

The present invention is an automatic subscription service that uses a client to poll a subscriber's email account. When the subscriber receives a new email, the present invention obtains the email from the subscriber's email account, extracts the headers from the email messages and convert the header from text to speech using any of a variety of well-known text to voice conversions. The converted headers are stored in a voicemail account corresponding to the person's email account. The person's voicemail account can be set up to notify the person of the new voicemail corresponding to the new email. In this manner, the person is notified of the delivery of an email without having to be at a computer and without significant changes to the existing notification infrastructure. Moreover, this removes the requirement of following an email with a call notifying the intended recipient of the email.

In alternative embodiments of the present invention, the person is notified by a page of new voicemail messages. If the pager has a text capability, the text of the email header is presented to the subscriber.

In a preferred embodiment of the present invention, the notifications can be from more than one email account. Thus, the subscriber may have, for example, an office email account and a home email account. The notification system of the present invention can poll each account for the presence of new email, and notify the subscriber accordingly. In the preferred embodiment, a code or other indicator is used to differentiate the source of the email or its priority.

Preferably, no changes are made to existing email servers. The system of the present invention preferably accesses the email information for each of its subscribers in a conventional fashion to determine if there are any new email messages for a particular subscriber.

Thus, one object of the present invention is to provide notification of the receipt of an email message to the email message's recipient or recipients.

Another object of the present invention is to provide notification of the receipt of an email message without requiring the recipient to be at a computer.

Yet another object of the present invention is to provide notification of an email message without significantly modifying existing notification structures.

Yet another object of the present invention is to provide notification of email messages using pagers.

Yet another object of the present invention is to provide notification of receipt of email messages though voicemail.

Yet another object of the present invention is to provide notification of the receipt of an email message from any number of email accounts a subscriber may desire.

Yet another object of the present invention is to provide notification of the receipt of an email message without significant change to conventional email notification systems.

These and other objects of the present invention are described in greater detail in the detailed description of the invention, the appended drawings and the attached claims.

DETAILED DESCRIPTION OF THE PREFERRED EMBODIMENTS

Figure 1:
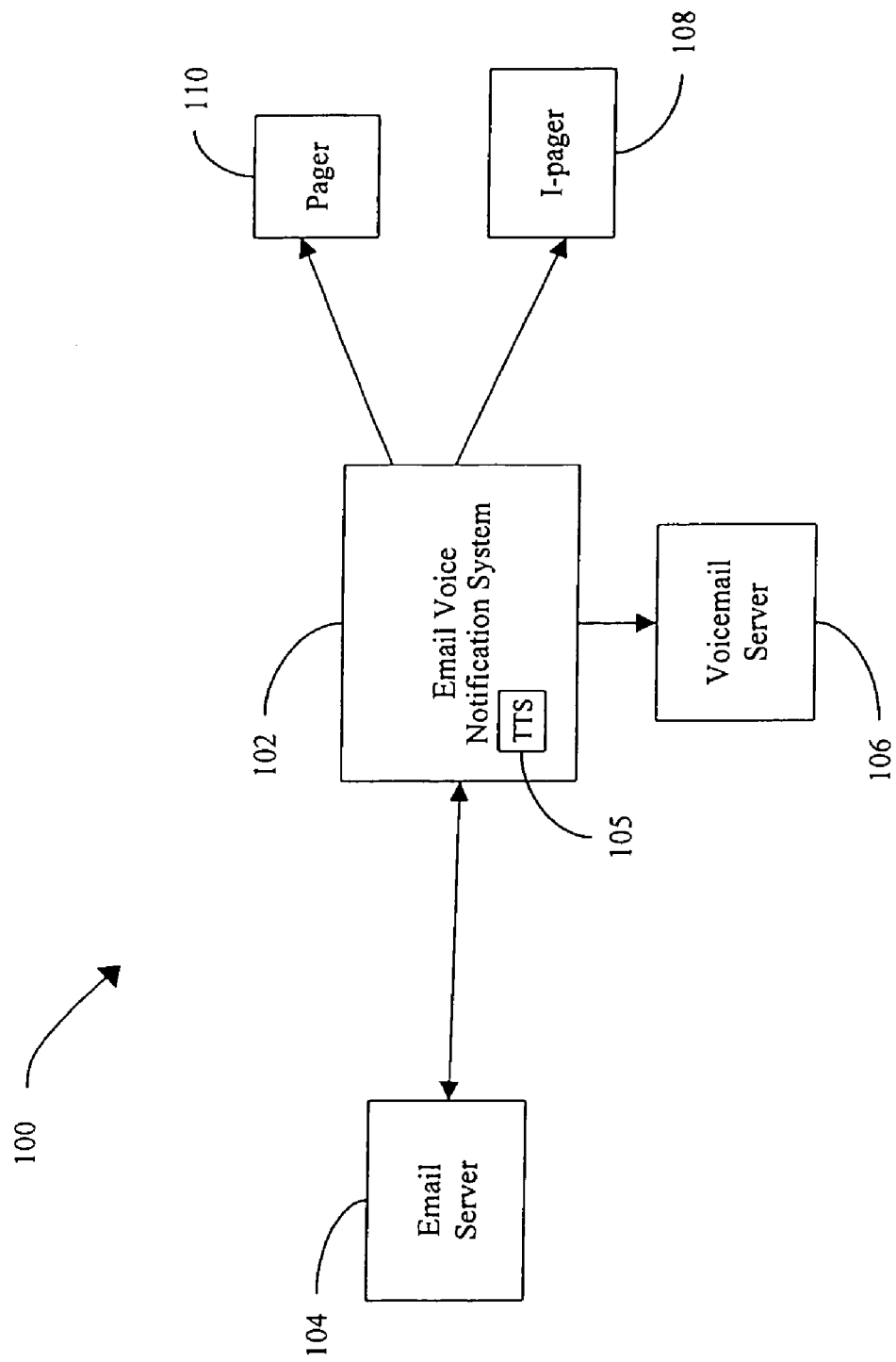
FIG. 1 is a schematic illustration of a system for providing notification of email messages according to a preferred embodiment of the present invention.
Figure 2:
FIG. 2 illustrates a preferred structure for an account record of required subscriber contact information according to a preferred embodiment of the present invention.

A preferred embodiment of a system 100 for notifying a subscriber of the receipt of an email message is illustrated schematically in FIG. 1. An email voice notification system (EMVN) 102 obtains the data required for the email notification according to the preferred embodiment of the present invention. In a preferred embodiment of the present invention, EMVN 102 also carries out the email notification. For each subscriber, EMVN 102 logs into an email server 104 that holds the subscriber's email account. An exemplary email server 104 is an SMTP email server. SMTP email servers are well known to those skilled in the art. Preferably, EMVN 102 interacts with an email server in a conventional manner. For example, where email server 104 is an SMTP server, EMVN 102 preferably communicates with email server 102 as a conventional SMTP client, for example, OUTLOOK or any other standard SMTP client. EMVN 102 would then obtain any new email messages. EMVN 102 executes a text-to-voice converter to convert the header information in the email to voice. If desired, only a portion of the header information need be converted to speech. Such text-to-voice converters are well known, for example, Lucent TTS, available from Lucent Technologies in Murray Hill, N.J.

After converting the email header information from text to voice, EMVN 102 preferably calls up voice mail system 106 to access the voice mailbox of the subscriber. Preferably, EMVN 102 has access to a database 107 containing an account record (described below) for the subscriber, including for example, subscriber voice mail information. Accessing the subscriber's voicemail can require authorization such as providing a PIN code. In the preferred embodiment of the present invention, the PIN code is obtained by accessing the subscriber information in the subscriber's account record stored in database 107.

When EMVN 102 successfully accesses the subscriber's voicemail system 106, it leaves a voice mail message containing the email header information that was converted from text to speech. In a preferred embodiment of the present invention, the information left in the voice mail notification message extracted from the header information includes: the time the message was sent, the identity of the sender and the subject of the message if there is one. In addition, the priority of the message can be given, for example high, normal or low. In addition, the subscriber can be notified if there are any attachments to the email.

Preferably voicemail system 106 is configured to send a message to the subscriber's pager, digital phone, or some other device for notifying the subscriber. Preferably, the voicemail notification is independent of the EMVN 102. That is, EMVN 102 generates a new voicemail message containing information regarding any new email. The subscriber's existing voicemail notification system notifies the subscriber of the voicemail message in a conventional fashion. For example, if voicemail system 106 is connected to a pager, it sends a page to the subscriber to notify the subscriber of the new message. In an alternative preferred embodiment of the present invention, voicemail system 106 is integrated with EMVN 102.

In an alternative embodiment of the present invention, EMVN 102 performs the notification to the subscriber itself. In the alternative preferred embodiment, EMVN 102 sends a message to a pager identified in the subscriber's account record (described below), for example, I-pager 108 or pager 110. In either case, if the pager is text capable, the email header information, or a portion thereof, is displayed as text on the pager display. In this case, the email header does not have to be first converted to speech. If the pager is not text capable, a code, for example, the number 777, can be displayed on the pager to indicate that new email has been received. The information to contact pager 108 or page 110 is stored in an account record (described below) for the subscriber.

EMVN 102 can be set up to poll email server 102 according to any desired criteria. For example, polling can be periodic, for example once per hour. Alternatively, polling can be random, for example 6 times a day, but not at set times. It would be apparent to those skilled in the art that other polling paradigms can be used that fall within the scope and spirit of the present invention. In addition, the same polling can be applied for each subscriber, or different polling can be performed for different subscribers. For example, higher paying subscribers might be assigned a higher polling frequency. In the latter instance, polling frequency is a field stored in the subscriber's account record stored in database 107. In a preferred embodiment, the notification is sent to more than one notification device at the same time. For example, EMVN 102 can post a voicemail message containing the header information, and at the same time send a notification message to a pager associated with the subscriber.

An exemplary subscriber account record stored in database 107 is illustrated in Table I. Preferably, the account record contains the following fields:

TABLE I

Fields in subscriber account record

| FIELD | DESCRIPTION |
| --- | --- |
| SUBSCRIBER NAME | Name of the subscriber. |
| POLL TIME | Frequency with which the subscriber's email account is polled. |
| LAST POLLED | Time the subscriber's email account was last polled. This value can be used in conjunction with the POLL TIME field and the current time to determine if the subscriber's email account should be polled again. |
| EMAIL SRV | Address of the subscriber's email account. |
| EMAIL ACCT | Subscriber's email account name. |
| EMAIL PW | Subscriber's email authorization information, for example password or PIN. |
| EMAIL TYPE | Type of email account, for example, SMTP or X.400. EMVN 102 consults the EMAIL TYPE field to determine the appropriate protocol to use when communicating with email server 104. |
| VOICEMAIL SRV | address of the subscriber's voicemail server. If the subscriber uses just an answering machine, this field contains the telephone number of the answering machine. |
| VOICEMAIL ACCT | Account number of the subscriber's voicemail account, for example extension number. |
| VOICEMAIL PW | Any required password information that is required to leave a message on the subscriber's voicemail. |
| PAGER SRV | Address of the server that sends a message to the subscriber's pager, or the telephone number of the subscriber's pager. Alternatively, the PAGER SRV field contains the phone number of the subscriber's pager. |
| PAGER ACCT | Account number or identification code of the pager, if required, to send a message to the subscriber's pager. |
| PAGE PW | Any password required to send a message to the subscriber's pager. |

If the subscriber desires that multiple email accounts be monitored, then the POLL TIME, LAST POLLED, EMAIL SRV, EMAIL ACCT, EMAL PW and EMAIL TYPE fields are all repeated as necessary to represent each of the subscriber's email accounts to be polled. The POLL TIME and LAST POLLED fields can be different for each of the subscriber's email accounts. Thus, subscribers can choose to have their different email accounts polled according to different criteria. For example, subscribers might want to poll their office email accounts more often than their personal email accounts.

EMVN 102 is preferably a UNIX system, though any system capable of performing the email server client and notification functions described herein can be used. The present invention is protocol-independent. That is, the email server 104 can be any email server. EMVN 102 would have to be programmed to perform the functions described herein for the kind of email server being used, as defined in the EMAIL TYPE field. Programming EMVN 102 to communicate with an email server to provide the functions described herein would be apparent to those skilled in this art.

In a preferred embodiment of the present invention, EMVN 102 is offered as a subscription service. That is, subscribers pay an additional fee periodically (preferably a month) for the email notification service.

Figure 3A:
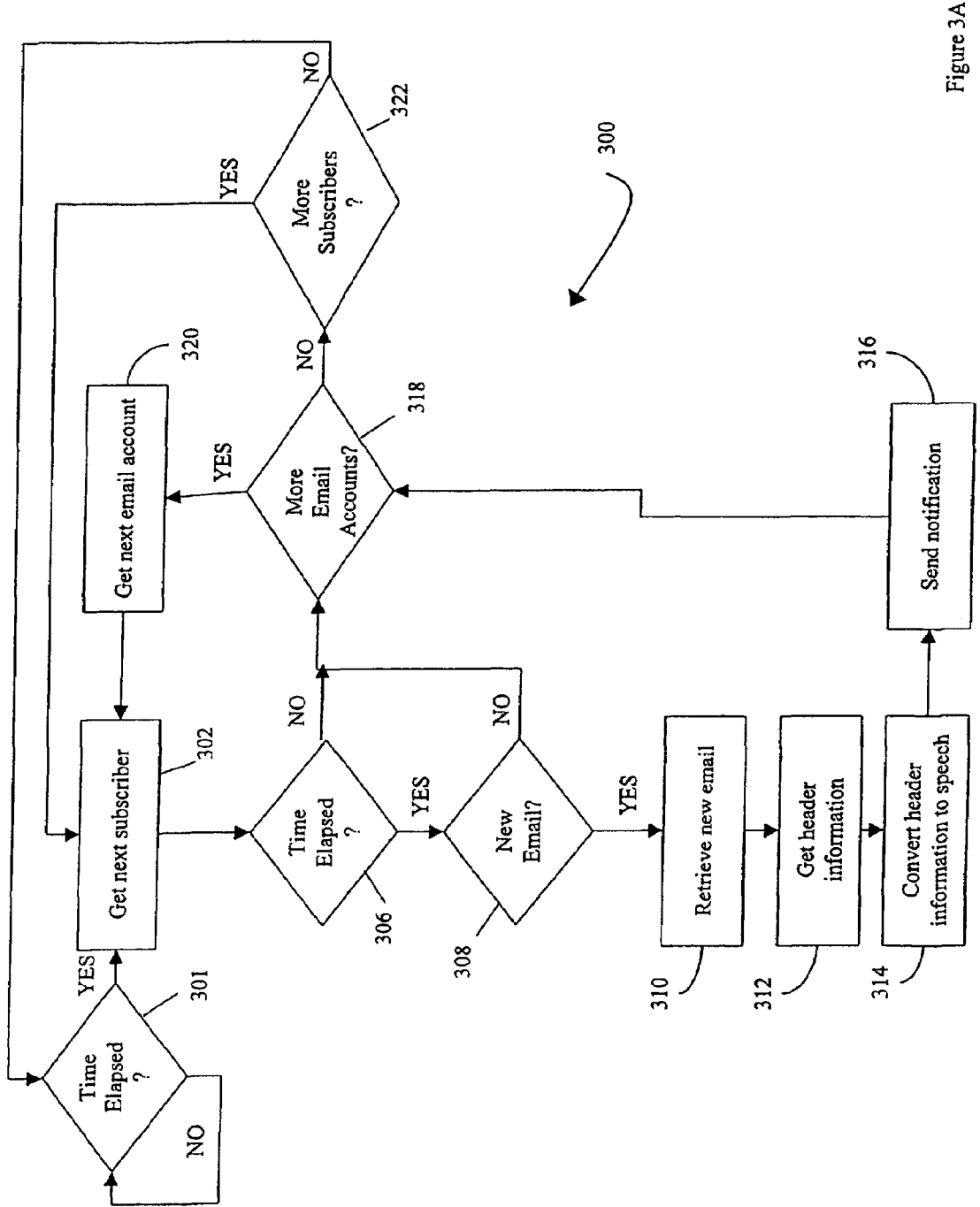
FIG. 3A is a flow chart for a process for email notification according to a first preferred embodiment of the present invention.
Figure 3B:
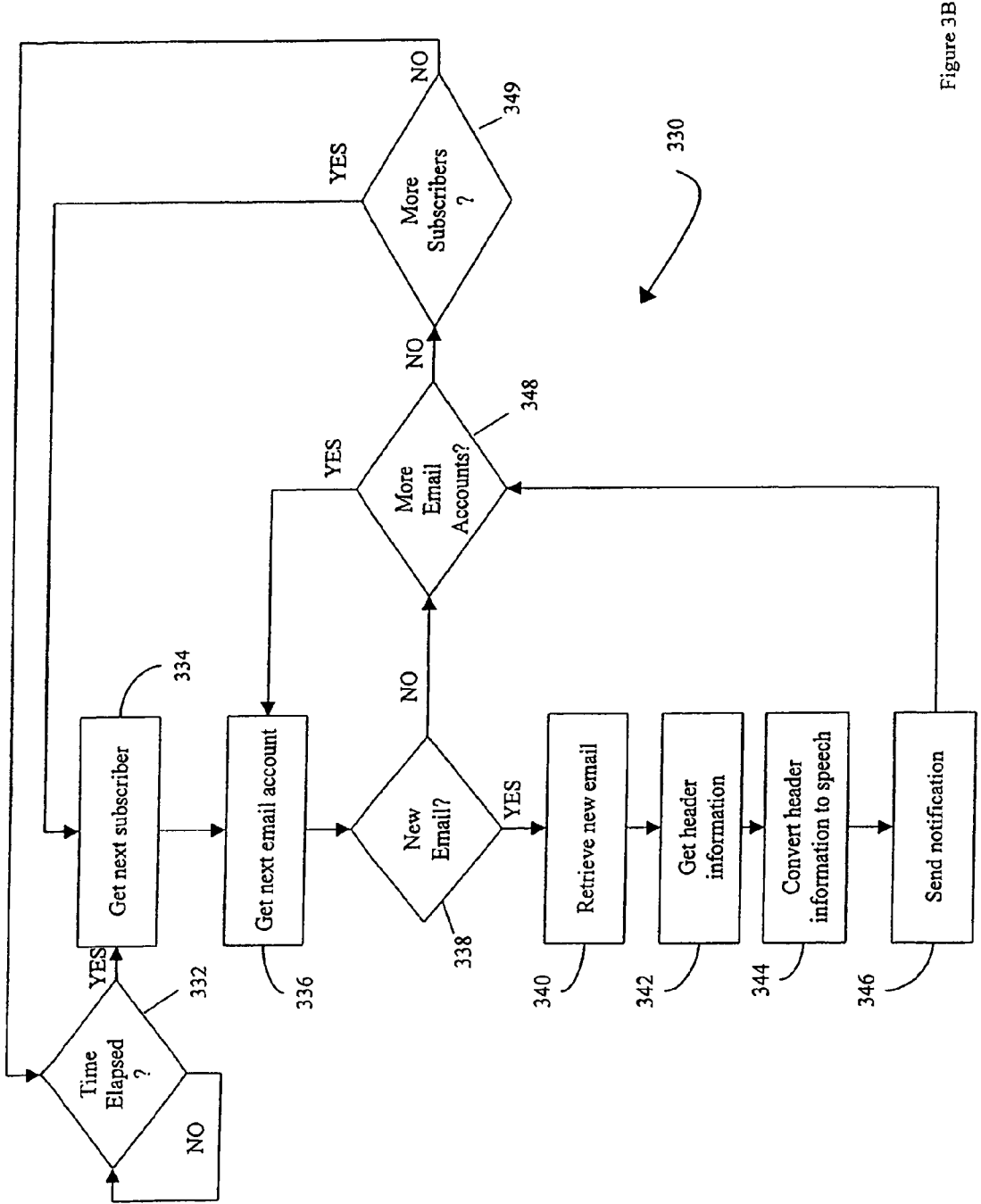
FIG. 3B is a flow chart for a process for email notification according to a second preferred embodiment of the present invention.
Figure 3C:
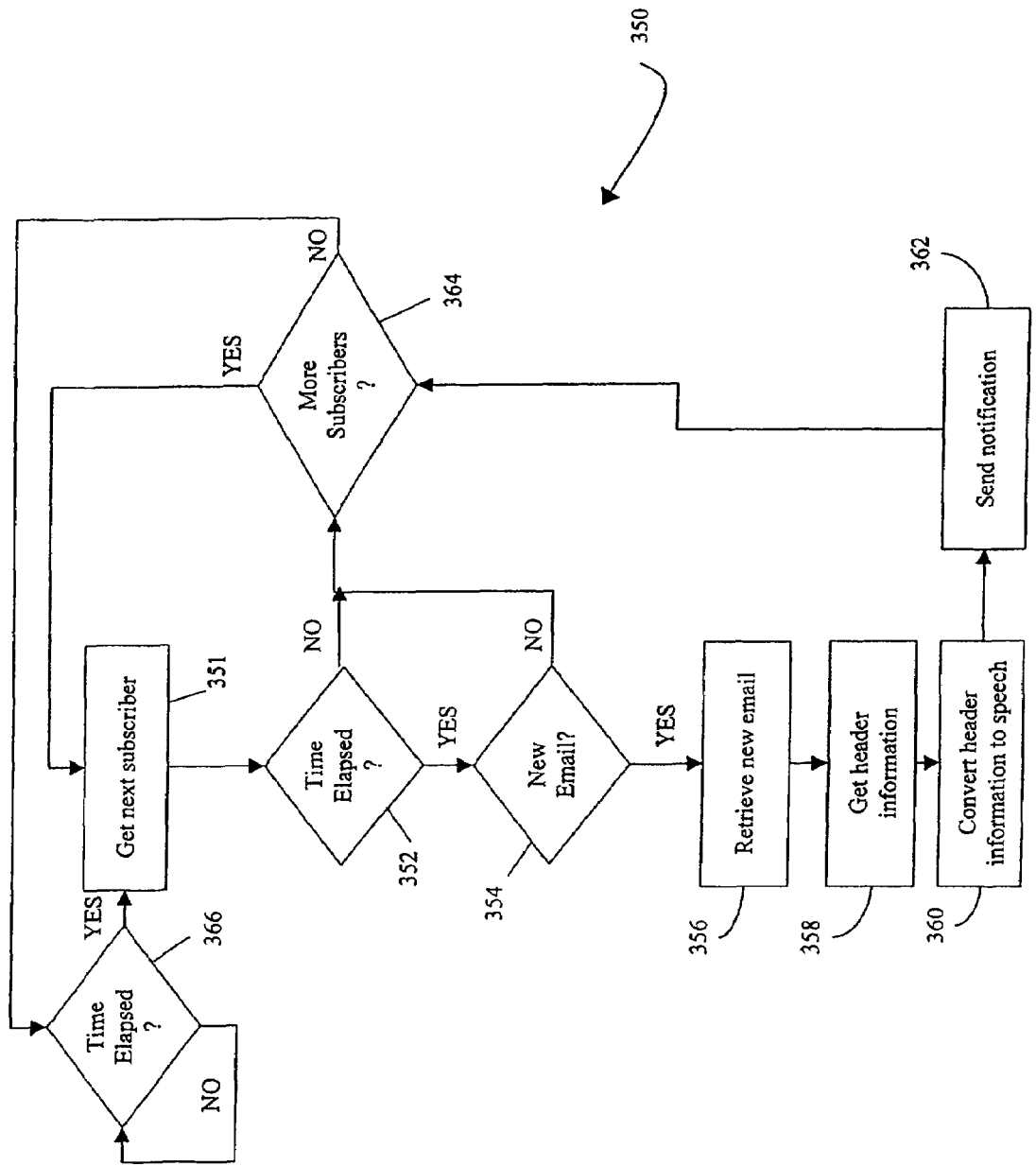
FIG. 3C is a flow chart for a process for email notification according to a third preferred embodiment of the present invention.

FIGS. 3A-3C are flow charts of exemplary processes 300, 330 and 350 respectively according to alternative preferred embodiments of the present invention. Processes 300, 330 and 350 preferably execute on EVMN 102. Referring to FIG.

3A a process 300 according to a first preferred embodiment of the present invention is described. Process 300 preferably executes on EMVN 102. In step 301, process 300 determines whether a predetermined time has elapsed for polling email server 104 for new emails. If the predetermined time has not elapsed, then process 300 stays in step 301. If the predetermined time has elapsed, then process 300 gets the next subscriber record to be polled in step 302. If this is the first iteration, then process 300 gets the first subscriber record to be polled in step 302. In step 306, process 300 determines whether a second predetermined time has elapsed for the current subscriber record to be polled. This second predetermined time is used for subscribers that may have multiple email accounts to be polled (for example, work and personal email accounts). As described above, the subscriber may have different email accounts with different polling requirements for each account. If the second predetermined time has elapsed in step 306, process 300 continues in step 308 where process 300 determines if there is any new email in the subscriber's email account. If there is new email, process 300 retrieves all new email in step 310. Process 300 extracts header information from each of the new email messages in step 312. Process 300 converts the text header information to speech in step 314. Process 300 sends the speech information to a voice mailbox associated with the subscriber in step 316. The subscriber is notified of the new voicemail, for example, in one of the ways described above.

If in step 308 there is no more email, process 300 continues in step 318. Process 300 continues in step 318 if the second predetermined time has not elapsed as determined in step 306. In step 318, process 300 determines if the subscriber has more email accounts. If the subscriber has more email accounts, then process 300 obtains the next email account in step 320 and continues processing in step 306 as described above. If the subscriber has no more email accounts, process 300 continues in step 322 where it determines if there are more subscribers for whom email account polling is required. If there are more subscribers, process 300 gets the next subscriber record in step 302 and processing continues as described above for the new subscriber record. If there are no more subscribers, process 300 continues in step 301 where it waits for the first predetermined time to elapse before repeating the entire process. If should be noted that the first predetermined time can be arbitrary. In an alternative preferred embodiment, process 300 is started by an operator initiating the process by, for example, clicking on a START button on a computer display.

Referring to FIG. 3B, a process 330 according to a second preferred embodiment of the present invention is described. Process 330 preferably executes on EMVN 102. In step 332, process 330 determines whether a predetermined time has elapsed for polling email server 104 for new emails. If the predetermined time has not elapsed, then process 330 stays in step 331. If the predetermined time has elapsed, then process 330 gets the next subscriber record to be polled in step 334. If this is the first iteration, then process 330 gets the first subscriber record to be polled in step 334.

Process 330 gets the next (or first) email account in step 336 in the subscriber record. As described above, subscribers can have multiple accounts. In step 338, process 330 determines if there is any new email in the subscriber's email account. If there is new email, process 330 retrieves all new email in step 340. Process 330 extracts header information from each of the new email messages in step 342. Process 330 converts the text header information to speech in step 344. Process 330 sends the speech information to a voice mailbox associated with the subscriber in step 346. The subscriber is notified of the new voicemail, for example, in one of the ways described above.

If in step 338 there is no more email, process 330 continues in step 348. In step 348, process 330 determines if the subscriber has more email accounts. If the subscriber has more email accounts, then process 330 obtains the next email account in step 336 and continues processing in step 338 as described above. If the subscriber has no more email accounts, process 330 continues in step 349 where it determines if there are more subscribers for whom email account polling is required. If there are more subscribers, process 330 gets the next subscriber record in step 334 and processing continues as described above for the new subscriber record. If there are no more subscribers, process 330 continues in step 332 where it wait for the first predetermined time to elapse before repeating the entire process. If should be noted that the first predetermined time can be arbitrary. In an alternative preferred embodiment, process 330 is started by an operator initiating the process by, for example, clicking on a START button on a computer display.

Referring to FIG. 3C, a process 350 according to a third preferred embodiment of the present invention is described. Process 350 preferably executes on EMVN 102. In step 366, process 350 determines whether a predetermined time has elapsed for polling email server 104 for new emails. If the predetermined time has not elapsed, then process 350 stays in step 366. If the predetermined time has elapsed, then process 350 gets the next subscriber record to be polled in step 351. If this is the first iteration, then process 350 gets the next (or first) subscriber record to be polled in step 351.

Process 350 determines whether the time has elapsed for this subscriber's account to be polled in step 352. If that time has elapsed, process 350 determines if there is any new email in the subscriber's email account in step 354. If there is new email, process 350 retrieves all new email in step 356. Process 350 extracts header information from each of the new email messages in step 358. Process 350 converts the text header information to speech in step 360. Process 350 sends the speech information to a voice mailbox associated with the subscriber in step 362. The subscriber is notified of the new voicemail, for example, in one of the ways described above.

If in step 354 there is no more email, process 350 continues in step 364 where it determines if there are more subscribers for whom email account polling is required. If there are more subscribers, process 350 gets the next subscriber record in step 351 and processing continues as described above for the new subscriber record. If there are no more subscribers, process 350 continues in step 366 where it wait for the first predetermined time to elapse before repeating the entire process. If should be noted that the first predetermined time can be arbitrary. In an alternative preferred embodiment, process 350 is started by an operator initiating the process by, for example, clicking on a START button on a computer display.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for providing notification of an incoming email message to a subscriber, comprising:

an email server to which the incoming email message is sent and on which the incoming email is stored;

an email notification server to automatically poll the email server for presence of at least one new email message;

a header extraction process to extract the header of the new email message;

a text-to-speech converter to extract at least a portion of the header to speech as converted header information;

a process to call a voicemail server corresponding to the subscriber and leave a voicemail message indicating the presence of the new email message and containing the converted header information; and a process to automatically notify the subscriber of the voicemail message in a manner which refers to the new email message;

wherein more than one email account are assigned to the subscriber, the email notification server automatically polls each email account of the subscriber for the presence of new email messages, and different preferences are capable of being designated by the subscriber for polling each email account in an account record.

2. The system recited in claim 1, wherein the process to notify the subscriber of the voicemail message comprises sending the converted header information to the subscriber.

3. The system recited in claim 1, wherein each email account has a different predetermined amount of time, capable of being specified in the account record by the subscriber, that the email notification server waits prior to polling the email account.

4. A method for notifying a subscriber of the presence of new email messages, comprising:

automatically polling an email account associated with the subscriber by an email notification server for the presence of at least one new email message when a predetermined amount of time has elapsed;

obtaining the new email message;

extracting at least a portion of header information of the new email message as extracted header information;

contacting, by the email notification server, a voicemail system associated with the subscriber;

leaving, by the email notification server, a voicemail message for the subscriber in a manner which refers to the new email message and containing the header information; and automatically notifying the subscriber of the voicemail message;

determining whether the subscriber has additional email accounts; and automatically polling each additional email account if the subscriber has additional email accounts, wherein different preferences are capable of being designated by the subscriber for polling each of the additional email accounts in an account record.

5. The method recited in claim 4, further comprising converting the extracted header information to speech as converted header information.

6. The method recited in claim 4 wherein the email notification server service automatically polls each of the additional email accounts for presence of new email message, and wherein each of the additional email accounts has a different predetermined amount of time capable of being set in the account record by the subscriber that the email notification service waits to poll new email message.

7. The method recited in claim 4, wherein the notifying the subscriber of the voicemail message further comprises:

sending a text message to a digital phone.

8. The method recited in claim 4, wherein the notifying the subscriber of the voicemail message further comprises:

sending a text message to a digital phone, the text message including the extracted header information.

9. A system for providing email notification to a plurality of subscribers, comprising:

one or more email servers to which emails destined for any of the plurality of subscribers are sent and stored;

a database system containing an account record corresponding to each of the plurality of subscribers;

a notification server coupled to the database system, the notification server comprising:

a first process to automatically poll the one or more email servers to determine if there are any new email messages for the plurality of subscribers, wherein the one or more email servers for the plurality of subscriber are assigned with different predetermined amounts of time that the first process waits to poll for the new email messages; and a second process to read an account record in the database corresponding to each subscriber to determine information needed to notify each subscriber, the second process further configured to, for each subscriber, leave a voicemail message indicating the presence of a new email message and to automatically notify that subscriber of the voicemail message in a manner which refers to the new email message;

wherein a plurality of email accounts are assigned to at least one of the subscribers, the first process automatically polls each email account of the plurality of email accounts of the at least one subscriber for the presence of new email messages, and a different predetermined amount of time is capable of being designated by the at least one subscriber for polling each email account in the account record.

10. The system recited in claim 9, wherein the notification server further comprises a third process to automatically obtain each new email message from each of the one or more email servers, convert at least a portion of the email header associated with each new email message from text to speech as converted header information and to send the converted header information to a voice mailbox corresponding to the subscriber to whom the email was directed.

11. The system recited in claim 9, wherein the account record contains email contact information for the subscriber corresponding to the account record.

12. The system recited in claim 9, wherein the email contact information includes a field describing a type of email system.

13. The system recited in claim 9, wherein the account record contains voicemail contact information for the subscriber corresponding to the account record.

14. The system recited in claim 9, wherein the account record contains pager contact information for the subscriber corresponding to the account record.

15. The system recited in claim 9, wherein the second process notifies the subscriber of the voicemail message by sending a pager message to the subscriber.

16. The system recited in claim 9, wherein the second process notifies the subscriber of the voicemail message by sending a pager message to the subscriber which includes the header of the e-mail message.

17. The system recited in claim 9, wherein prior to polling for a particular subscriber, the first process first determines if a predetermined time that is preset to the particular subscriber has been reached, and polling for the particular subscriber only if the predetermined time has been reached.

18. The system recited in claim 17, wherein prior to polling a particular email account for a particular subscriber, the first process first determined if a predetermined time that is preset for the particular email account has been reached, and polling the particular email account for the particular subscriber only if the predetermined time has been reached.

19. A computer readable medium storing computer readable instructions that cause a computer to perform providing email notification to a plurality of subscribers, the instructions causing the computer to further perform:
   connecting to a database to obtain an account record for a particular subscriber;
   obtaining email account contact information for the particular subscriber from the account record for the particular subscriber;
   automatically polling the email account according to the email account contact information for the presence of at least one new email message; and
   causing the particular subscriber to be notified of the new email message in the email account when the new email message has been polled from the email account, wherein causing the subscriber to be notified comprises:
      obtaining at least a portion of the header information from the new email message for the particular subscriber;
      converting the obtained header information from the new email message for the particular subscriber;
      sending the converted header information to a voicemail system associated with the particular subscriber in accordance with voicemail system contact information contained in the account record for the particular subscriber; and
      automatically notifying, in the server, the subscriber of the new email message using the converted header information, wherein the email notification is separate from and in addition to sending the converted header to the voicemail system;
   wherein the particular subscriber is assigned multiple email accounts, the program further comprising:
   automatically polling each of the email accounts for the presence of new email, wherein the multiple email accounts are polled in different predetermined amounts of time that are capable of being specified by the particular subscriber in an account record; and
   causing the particular subscriber to be notified of the presence of email in any of the email accounts.

20. The computer readable medium recited in claim 19, wherein polling the email account comprises polling the email account only after a predetermined time has elapsed.

21. The computer readable medium recited in claim 19, wherein causing the subscriber to be notified comprises sending a page to the particular subscriber in accordance with pager contact information contained in the account record.

22. The computer readable medium recited in claim 19, wherein notifying the subscriber of the new email message further comprises:
   sending a text message to a digital phone.

23. The computer readable medium recited in claim 19, wherein notifying the subscriber of the new e-mail message further comprises:
   sending a text message to a digital phone, the text message including the extracted header information.

24. A method for providing email notification to a plurality of subscribers, comprising:
   connecting to a database to obtain an account record for a particular subscriber;
   obtaining email account contact information for the particular subscriber from the account record for the particular subscriber;
   automatically polling, by an email notification server, the email account according to the email account contact information for the presence of new email; and
   causing the particular subscriber to be notified of a new email message in the email account by the email notification server, wherein causing the subscriber to be notified comprises:
      obtaining at least a portion of the header information from the new email message for the particular subscriber;
      converting the obtained header information to speech;
      sending the converted header information to a voicemail system associated with the particular subscriber in accordance with voicemail system information contained in the account record for the particular subscriber; and
      automatically notifying the subscriber of the new email message using the converted header information, wherein the email notification is separate from and in addition to sending the converted header information to the voicemail system;
   wherein the particular subscriber is assigned multiple email accounts, further comprising:
   automatically polling each of the email accounts for the presence of new email, wherein the multiple email accounts are polled in different predetermined amounts of time that are capable of being specified in the account record by the particular subscriber; and
   causing the particular subscriber to be notified of the presence of new email in any of the email accounts of the particular subscriber.

25. The method recited in claim 24, wherein the multiple email accounts are on multiple email servers.

26. The method recited in claim 24, wherein causing the subscriber to be notified comprises sending a page to the particular subscriber in accordance with pager contact information contained in the account record.

27. The method recited in claim 24, wherein the notifying the subscriber of the new email message further comprises:
   sending a text message to a digital phone.

28. The method recited in claim 24, wherein the notifying the subscriber of the new e-mail message further comprises:
   sending a text message to a digital phone, the text message including the extracted header information.

29. A system for providing notification of incoming email to a subscriber, comprising:
   an email server to which the incoming email message is sent and on which an incoming email message is stored;
   an email notification server to automatically poll the email server for the presence of the incoming email;
   a header extraction process to extract the header of the incoming email message;
   a text-to-speech converter to convert at least a portion of the header to speech as converted header information;
   a process to call a voicemail server corresponding to the subscriber and leave a voicemail message in a manner which refers to the incoming email message, the voicemail message containing the converted header information; and
   a process for automatically notifying the subscriber of the email message separate from and in addition to leaving the voicemail message;
   wherein more than one email account are assigned to the subscriber, the email notification server automatically polls each email account of the subscriber for the presence of new email messages, and different preferences are capable of being designated by the subscriber for polling each email account in an account record.

30. The system recited in claim 29, wherein the email notification server waits for the predetermined amount of time prior to polling the email server to obtain the incoming message, and the predetermined amount of time is specified in the account record.

31. The system recited in claim 29, wherein the predetermined amount of time is random.

32. The system recited in claim 29, wherein the process for automatically notifying the subscriber of the e-mail message performs the notification by sending a pager message to the subscriber.

33. The system recited in claim 29, wherein the process for automatically notifying the subscriber of the e-mail message performs the notification by sending a pager message to the subscriber which includes the header of the e-mail message.

34. A method for notifying a subscriber of the presence of new email, comprising:
   automatically polling, by an email notification server, an email account associated with the subscriber for the presence of at least one new email message;
   obtaining the new email message identified in response to the polling;
   extracting at least a portion of header information of the new email message identified in response to the polling;
   contacting, by the email notification server, a voicemail system associated with the subscriber;
   leaving, by the email notification server, a voicemail message for the subscriber in a manner which refers to the new email message, the voicemail message containing the converted header information; and
   automatically notifying, by the email notification server, the subscriber of the new email message identified in response to the polling, wherein the email notification is separate from and in addition to sending the voicemail message;
   wherein more than one email account are assigned to the subscriber, the email notification server automatically polls each email account of the subscriber for the presence of new email messages, and different preferences are capable of being designated by the subscriber for polling each email account in an account record.

35. The method recited in claim 34, further comprising sending a page to the subscriber to notify the subscriber of one or more of the new email messages.

36. The method recited in claim 34, further comprising placing a telephone call to a telephone number associated with the subscriber to notify the subscriber of one or more of the new email messages.

37. The method recited in claim 34, wherein the automatically notifying the subscriber of the new e-mail message further comprises:
   sending a text message to a digital phone.

38. The method recited in claim 34, wherein the automatically notifying the subscriber of the new e-mail message further comprises:
   sending a text message to a digital phone, the text message including the extracted header information.

39. The method recited in claim 34, further comprising converting the extracted header information to speech.

40. The method recited in claim 39, further comprising:
   determining whether the subscriber has additional email accounts; and
   for each additional email account:
      automatically polling the additional email account for the presence of new email messages, wherein the multiple email accounts are polled in different predetermined amounts of time;
      obtaining any new email messages identified in response to the polling of the additional email account;
      extracting at least a portion of header information of each new email message identified in response to the polling of the additional email account; and
      automatically notifying the subscriber of each new email message identified in response to the polling of the additional email account.

41. The method recited in claim 40, further comprising determining whether a predetermined time has elapsed for each of the subscriber's email accounts where the subscriber has multiple email accounts, and wherein the predetermined amount of time for each of the subscriber's email accounts is specified in the subscriber's account record.

* * * * *